(12) United States Patent
Machida et al.

(10) Patent No.: US 8,068,090 B2
(45) Date of Patent: Nov. 29, 2011

(54) IMAGE DISPLAY MEDIUM, IMAGE DISPLAY DEVICE, STORAGE MEDIUM STORING AN IMAGE DISPLAY PROGRAM, AND IMAGE DISPLAY METHOD

(75) Inventors: Yoshinori Machida, Kanagawa (JP); Kiyoshi Shigehiro, Kanagawa (JP); Yasufumi Suwabe, Kanagawa (JP); Satoshi Tatsuura, Kanagawa (JP); Masaaki Abe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 878 days.

(21) Appl. No.: 12/034,307

(22) Filed: Feb. 20, 2008

(65) Prior Publication Data

US 2008/0303778 A1 Dec. 11, 2008

(30) Foreign Application Priority Data

Jun. 5, 2007 (JP) ................... 2007-149240

(51) Int. Cl.
*G09G 3/34* (2006.01)
(52) U.S. Cl. .................. 345/107; 345/108; 359/296
(58) Field of Classification Search .................... 345/107
See application file for complete search history.

(56) References Cited

U.S. PATENT DOCUMENTS

| | | | | |
|---|---|---|---|---|
| 6,512,626 | B1 * | 1/2003 | Schmidt ........................ | 359/296 |
| 6,853,486 | B2 * | 2/2005 | Cruz-Uribe et al. .......... | 359/443 |
| 2005/0174341 | A1 | 8/2005 | Johnson et al. | |
| 2006/0077171 | A1 * | 4/2006 | May et al. ..................... | 345/107 |

FOREIGN PATENT DOCUMENTS

| | | |
|---|---|---|
| JP | A 1-267525 | 10/1989 |
| JP | A 2001-312225 | 11/2001 |
| JP | A 2005-524865 | 8/2005 |
| JP | A 2006-58901 | 3/2006 |

\* cited by examiner

*Primary Examiner* — Duc Dinh
(74) *Attorney, Agent, or Firm* — Oliff & Berridge, PLC

(57) ABSTRACT

There is provided an image display medium that includes: a pair of substrates at least one of that is light-transmissive; a liquid enclosed between the substrates; and three or more types of colored particles dispersed in the liquid that move in accordance with electric fields applied between the substrates and have different colors and charge characteristics, wherein at least one type of the colored particles has an opposite polarity from at least one other type of colored particles.

15 Claims, 12 Drawing Sheets

IMAGE DISPLAY MEDIUM, IMAGE DISPLAY DEVICE, STORAGE MEDIUM STORING AN IMAGE DISPLAY PROGRAM, AND IMAGE DISPLAY METHOD

CROSS-REFERENCE TO RELATED APPLICATION

This application is based on and claims priority under 35 USC 119 from Japanese Patent Application No. 2007-149240 filed Jun. 5, 2007.

BACKGROUND

1. Technical Field

The present invention relates to an image display medium, an image display device, a storage medium storing an image display program, and an image display method.

2. Related Art

Image display media using colored particles are known as conventional image display media which have a memory property and which can be rewritten repeatedly. Such an image display medium is structured to include, for example, a pair of substrates, and plural types of particle groups having different colors and different charge characteristics which are enclosed between the substrates and can move between the substrates due to an applied electric field. Further, there are also cases in which spacing members for partitioning the region between the substrate into plural cells are provided between the substrates for reasons such as preventing the particles from concentrating at one region between the substrates.

In such an image display medium, the particles are moved by voltage, which corresponds to an image, being applied between the pair of substrates, and the image is displayed as the contrast of the particles of the different colors. Note that, even after application of voltage is stopped, the particles remain adhered to the substrates due to van der Waals force and image force, and the image display is maintained.

SUMMARY

An aspect of the present invention is an image display medium having: a pair of substrates at least one of that is light-transmissive; a liquid enclosed between the substrates; and three or more types of colored particles dispersed in the liquid that move in accordance with electric fields applied between the substrates and have different colors and charge characteristics, wherein at least one type of the colored particles having an opposite polarity from at least one other type of colored particles.

BRIEF DESCRIPTION OF THE DRAWINGS

Exemplary embodiments of the present invention will be described in detail based on the following figures, wherein.

DETAILED DESCRIPTION

Figure 1:
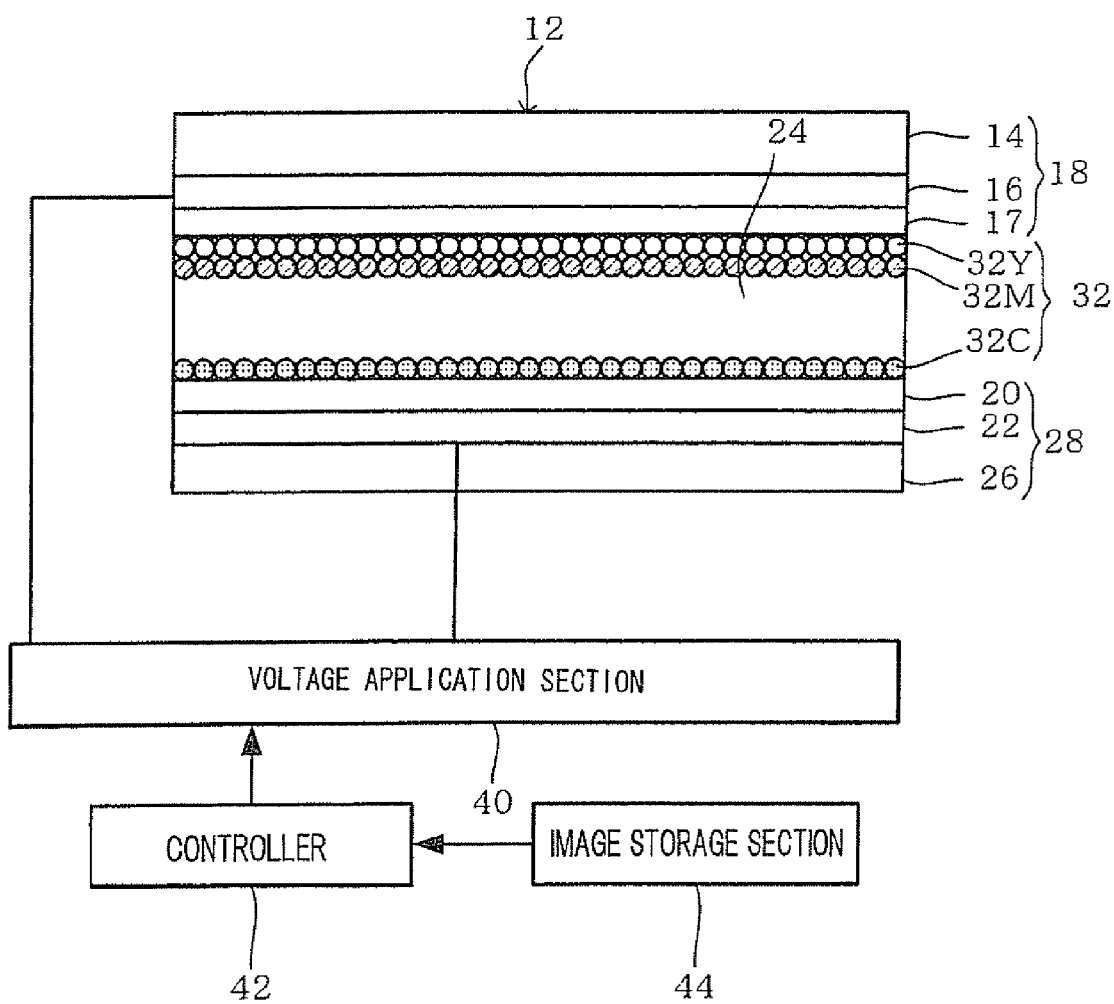
FIG. 1 is a schematic structural diagram showing an image display device relating to a first exemplary embodiment.

Exemplary embodiments of the present invention will be described in detail hereinafter with reference to the drawings. Note that members which have substantially the same functions are denoted by the same reference numerals throughout all of the drawings, and repeat description thereof may be omitted.

First Exemplary Embodiment

FIG. 1 is a schematic structural diagram showing an image display device relating to a first exemplary embodiment. Note that FIG. 1 is a drawing showing an example of red display.

As shown in FIG. 1, an image display device 10 relating to the first exemplary embodiment has an image display medium 12 which is structured from a display substrate 18 and a back surface substrate 28. The display substrate 18 is formed by a transparent electrode 16 and an obverse layer 17 being laminated on a supporting substrate 14. The back surface substrate 28 is disposed so as to oppose the display substrate 18 with a space therebetween, and is formed by an electrode 22 and an obverse layer 20 being laminated on a supporting substrate 26.

Three type of colored particles 32 (cyan particles 32C, magenta particles 32M, and yellow particles 32Y) and a dispersion liquid 24 (a transparent liquid) which is light-transmissive are enclosed between the display substrate 18 and the back surface substrate 28, and move electrophoretically between the substrates due to an electric field which is applied between the substrates. The three types of colored particles 32 have respectively different charge characteristics, and at least one type of the colored particles 32 has the opposite polarity. In the present exemplary embodiment, the cyan particles 32C are positively polarized, and the magenta particles 32M and the yellow particles 32Y are negatively polarized. Moreover, in the present exemplary embodiment, the respective colored particles 32 are particles which move electrophoretically between the substrates, and have respectively different absolute values of voltages required to move in accordance with the electric field. Note that the application voltages which are required in order for the three types of colored particles 32 to move can be controlled by, for example, the charge amount, the particle diameter, or the shape or properties of the particle surface, or the like.

Pigment particles of a desired color, or resin particles containing a pigment or dye of a desired color, can be used as the respective colored particles 32. For example, general pigments or dyes which are used as printing inks or color toners can be used as the pigment or dye.

In the present exemplary embodiment, the cyan particles 32C which are colored cyan, the magenta particles 32M which are colored magenta, and the yellow particles 32Y which are colored yellow are used as the colored particles 32, but the colors are not limited to these. The volume average particle diameter of the respective colored particles 32 is generally 0.01 μm to 10 μm, and preferably 0.03 μm to 3 μm, but is not limited to this range. If the volume average particle diameter of the colored particles 32 is smaller than the above range, there are cases in which the charge amount of the colored particles 32 may be small, and the speed of moving through the dispersion liquid 24 may be slow. Namely, there are cases in which the display responsiveness deteriorates. Conversely, if the volume average particle diameter of the colored particles 32 is greater than the aforementioned range, although the following-property thereof is good, it may be easy for precipitation due the weight of the colored particles 32 themselves and a deterioration in the memory property to occur. Note that the volume average particle diameter of the colored particles 32 is measured by the Laser Scattering Particle Size Distribution Analyzer LA-920 manufactured by Horiba, Ltd.

The dispersion liquid 24 which is light-transmissive may be an insulating, colorless, transparent liquid. For example, hydrocarbon solvents such as silicon, toluene, xylene, isoparaffin, normal paraffin, and the like can be used.

The transparent electrode 16 and the electrode 22 are respectively connected to a voltage application section 40. Namely, an electric field is applied between the substrates due to voltage being applied to the transparent electrode 16 and the electrode 22 by the voltage application section 40. Note that it suffices for the transparent electrode 16 and the electrode 22 to be able to form a desired electric field between the substrates, and the transparent electrode 16 and the electrode 22 may be disposed at the exterior of the image display medium 12 so as to be able to be attached to and removed from the display substrate 18 and the back surface substrate 28, respectively.

The voltage application section 40 is connected to a controller 42. An image storage section 44 is connected to the controller 42.

The controller 42 is structured to include a CPU, a ROM, a RAM, a hard disk, and the like. The CPU carries out display of images onto the image display medium 12 in accordance with a program which is stored in the ROM or the hard disk and the like. The image storage section 44 is structured by a hard disk or the like, and stores an image for display which is to be displayed on the image display medium 12. Namely, due to the controller 42 controlling the voltage application section 40 and applying voltage to be applied between the substrates in accordance with the image for display which is stored in the image storage section 44, the colored particles 32 move in accordance with the voltage and an image is displayed. Note that the image for display which is stored in the image storage section 44 may be taken-into the image storage section 44 via a network or any of various types of recording media such as a CD-ROM, a DVD, or the like.

Even after the application of voltage between the substrates is stopped, the colored particles 32 are, maintained in the state of the time when the voltage was applied, due to van der Waals force and image force.

Figure 2:
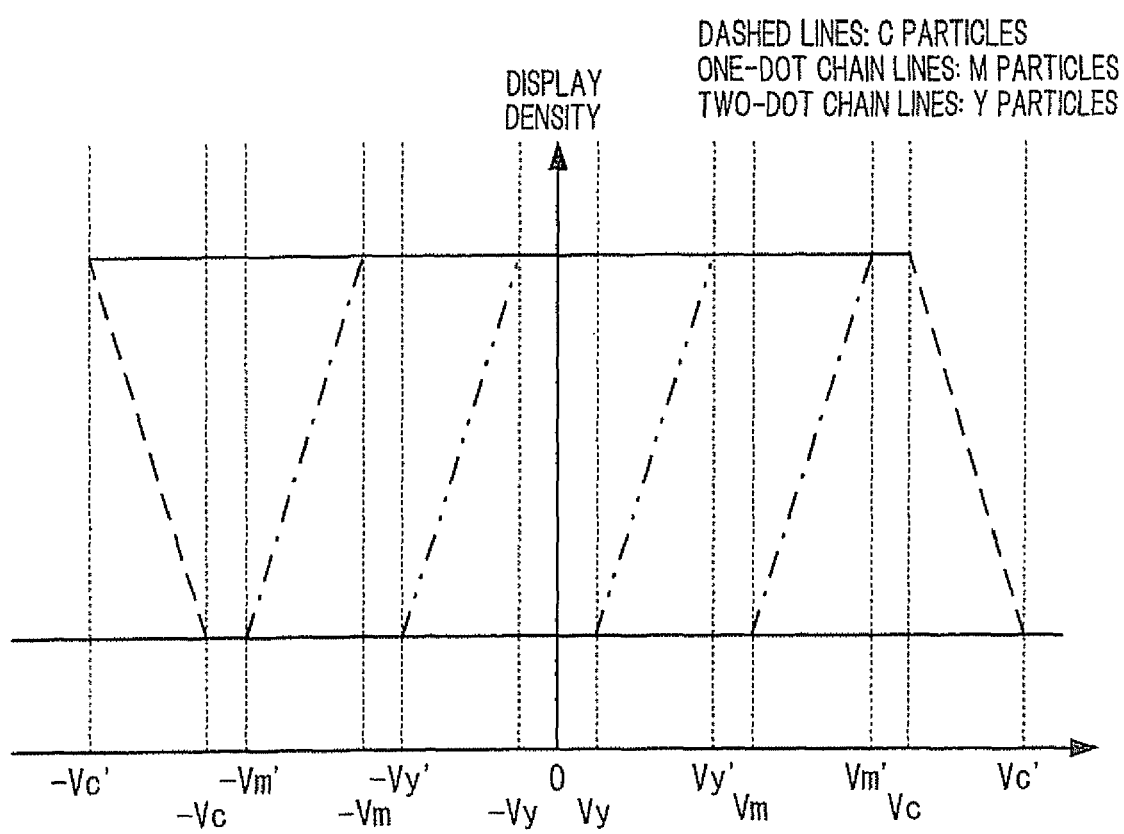
FIG. 2 is a drawing for explaining application voltages which are required in order to move colored particles in the image display device relating to the first exemplary embodiment.

FIG. 2 is a drawing for explaining application voltages which are required in order to move the colored particles 32 in the image display device relating to the first exemplary embodiment.

As described above, with regard to the application voltages which are required in order to move the colored particles 32, the absolute values of the voltages required in order for the respective colored particles 32 to move in accordance with the electric field at the time of moving electrophoretically between the substrates, are respectively different, and at least one type of the colored particles 32 has the opposite polarity. In more detail, as shown in FIG. 2, the voltage ranges required in order to move the respective colored particles 32 are respectively different. Here, the "voltage range required in order to move the colored particles" means a voltage range from the voltage required in order for the particles to start moving, up to a voltage at which, when the voltage or the voltage application time from the start of movement is further increased, no change arises in the display density and the display density is saturated.

Further, "maximum voltage required in order to move the colored particles" means a voltage at which, when the voltage or the voltage application time is further increased from the aforementioned start of movement, no change arises in the display density and the display density is saturated. The display density is the density at the time when, while the optical density (OD) at the display surface side is measured by a reflection densitometer (X-Rite 404) manufactured by X-Rite, Incorporated, voltage is applied between the display surface side and the back surface side, and the voltage is gradually changed in the direction in which the measured density increases (the application voltage is increased or decreased), the chance in density per unit voltage is saturated, and, even if the voltage or the voltage application time are increased in this state, no change in density arises and the density is saturated.

As described above, among the colored particles 32, the cyan particles 32C are positively polarized, and the magenta particles 32M and the yellow particles 32Y are negatively polarized. The absolute values of the voltage ranges for moving the respective colored particles are set in the following order of the magnitudes thereof: the absolute values $|Vc \leq V \leq Vc'|$ (the absolute values of the values between $Vc$ and $Vc'$) of the voltage range required in order to move the cyan particles 32C, the absolute values $|Vm \leq V \leq Vm|$ (the absolute values of the values between $Vm$ and $Vm'$) of the voltage range required in order to move the magenta particles 32M, and the absolute values $|Vy \leq V \leq Vy'|$ (the absolute values of the values between $Vy$ and $Vy'$) of the voltage range required in order to move the yellow particles 32Y Namely, the absolute values of the voltages required to move the cyan particles 32C are set to be the largest, and the cyan particles 32C which have the largest absolute value voltages have the opposite polarity. Further, in the exemplary embodiment, the respective colored particles 32 can be driven independently by setting the voltage ranges required in order to move substantially all of the respective colored particles 32 such that they do not overlap one another. Note that "substantially all" means that, because there is dispersion in the characteristics of the colored particles 32, the characteristics of some of the colored particles 32 differ to an extent of not contributing to the display characteristic. Namely, when the voltage or the voltage application time is further increased from the aforementioned start of movement, there is a state in which no change arises in the display density and the display density is saturated.

Next, an example of driving control of the image display device, which relates to the first exemplary embodiment and is structured as described above, will be described. Note that, hereinafter, in order to simplify explanation, description is given with the electrode 22 at the back surface substrate 28 side being ground (0 V) and voltage being applied to the transparent electrode 16 at the display substrate 18 side.

First, when the voltage application section 40 applies application voltage V (−Vc'), which has the largest absolute values of the voltage ranges required in order to move the respective particles, between the transparent electrode 16 and the electrode 22 due to the control of the controller 42, the cyan particles 32C which are positively polarized move to the display substrate 18 side, and the magenta particles 32M and the yellow particles 32Y which are negatively polarized move to the back surface substrate 28 side. The state (1) in FIG. 3 thereby arises, and cyan is displayed.

Further, when the voltage application section 40 applies the application voltage V (Vc'), which has the largest absolute values of the voltage ranges required in order to move the respective particles, between the transparent electrode 16 and the electrode 22 due to the control of the controller 42, the magenta particles 32M and the yellow particles 32Y which are negatively polarized move to the display substrate 18 side, and the cyan particles 32C which are positively polarized move to the back surface substrate 28 side. The state (2) in FIG. 3 thereby arises, and red, which is a subtractive color mixture of magenta and yellow, is displayed.

Figure 3:
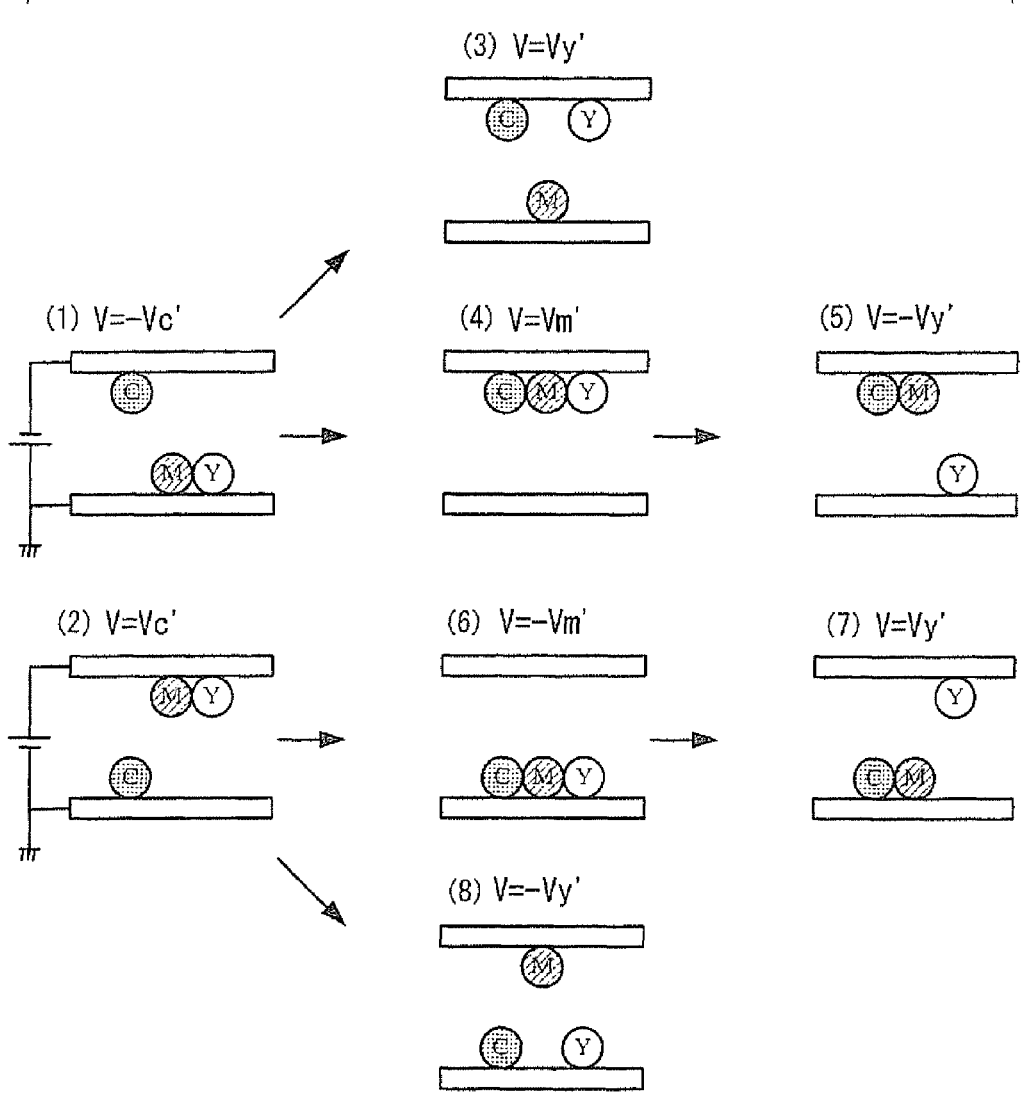
FIG. 3 is a drawing for explaining an example of driving control of the image display device relating to the first exemplary embodiment.

From the state (1) in FIG. 3 (the cyan display state), due to the voltage application section 40 applying the application voltage V (Vy') between the transparent substrate 16 and the electrode 22 due to the control of the controller 42, the yellow particles 32Y move to the display substrate 18 side. The state (3) in FIG. 3 thereby arises, and green, which is a subtractive color mixture of cyan and yellow, is displayed.

From the state (1) in FIG. 3 (the cyan display state), due to the voltage application section 40 applying the application voltage V (Vm') between the transparent substrate 16 and the electrode 22 due to the control of the controller 42, the magenta particles 32M and the yellow particles 32Y move to the display substrate 18 side. The state (4) in FIG. 3 thereby arises, and black or grey, which is a subtractive color mixture of cyan, magenta and yellow, is displayed.

From the state (4) in FIG. 3 (the black or grey display state), due to the voltage application section 40 applying the application voltage V (−Vy') between the transparent substrate 16 and the electrode 22 due to the control of the controller 42, the yellow particles 32Y move to the back surface substrate 28 side. The state (5) in FIG. 3 thereby arises, and blue, which is a subtractive color mixture of cyan and magenta, is displayed.

From the state (2) in FIG. 3 (the red display state), due to the voltage application section 40 applying the application voltage V (−Vm') between the transparent substrate 16 and the electrode 22 due to the control of the controller 42, the magenta particles 32M and the yellow particles 32Y move to the back surface substrate 28 side. The state (6) in FIG. 3 thereby arises, and a non-display state arises. Note that, at this time, if the dispersion liquid 24 is colored, the color of the dispersion liquid 24 is displayed. For example, if the dispersion liquid 24 is colored to white, white display becomes possible.

From the state (6) in FIG. 3 (the non-display state), due to the voltage application section 40 applying the application voltage V (Vy') between the transparent substrate 16 and the electrode 22 due to the control of the controller 42, the yellow particles 32Y move to the display substrate 18 side. The state (7) in FIG. 3 thereby arises, and yellow is displayed.

From the state (2) in FIG. 3 (the red display state), due to the voltage application section 40 applying the application voltage V (−Vy') between the transparent substrate 16 and the electrode 22 due to the control of the controller 42, the yellow particles 32Y move to the back surface substrate 28 side. The state (8) in FIG. 3 thereby arises, and magenta is displayed.

Figure 4:
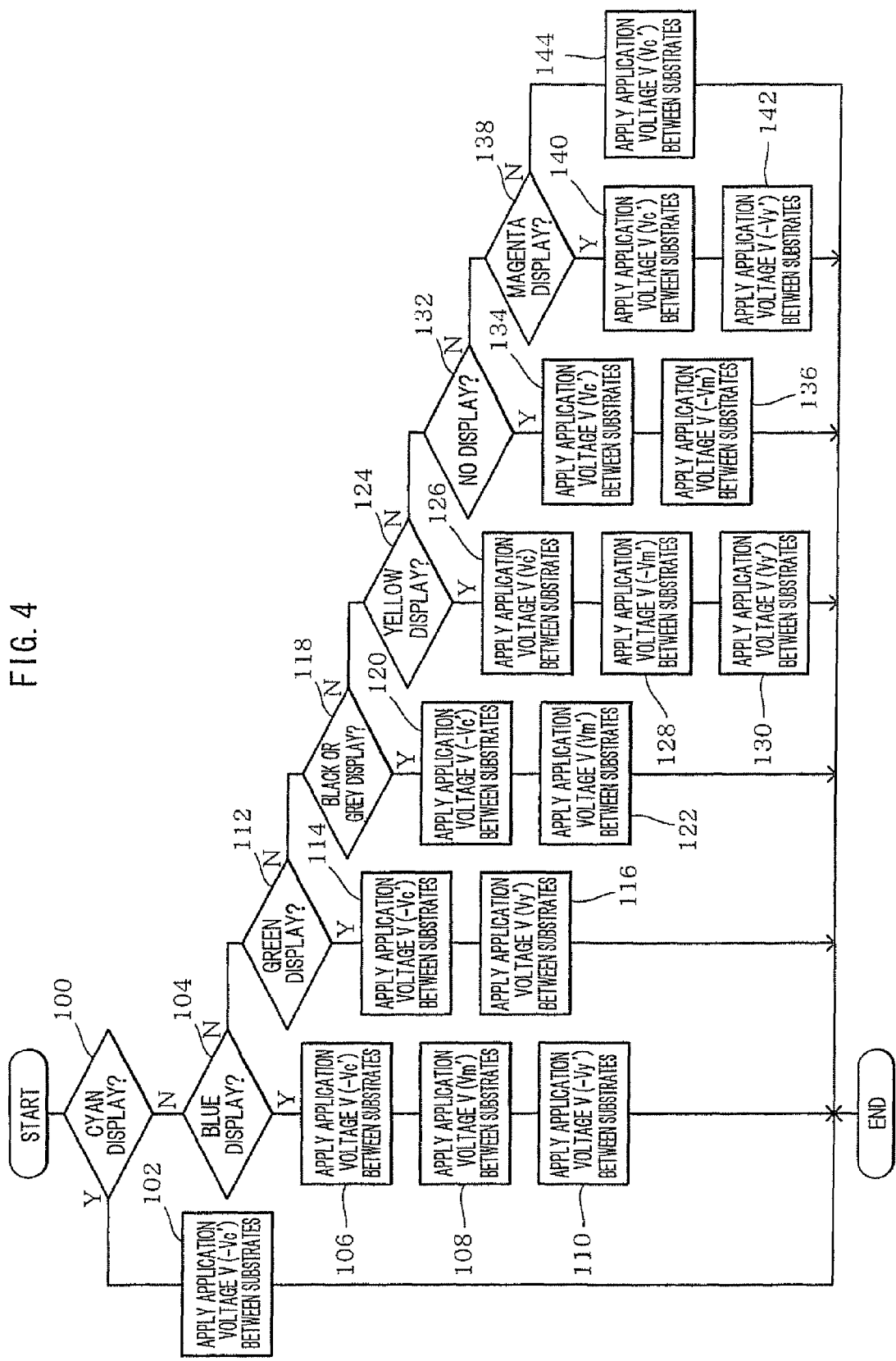
FIG. 4 is a flowchart showing an example of the flow of display driving control of the image display device relating to the first exemplary embodiment.

FIG. 4 is a flowchart showing an example of the flow of display driving control of the image display device relating to the first exemplary embodiment. Note that the display driving control shown in FIG. 4 may be carried out by a hardware structure such as a circuit board or the like, or may be carried out by a software structure such as a program that causes a computer to execute processing. Further, in the same way as described above, description will be given with the electrode 22 at the back surface substrate 28 side being ground (0 V) and voltage being applied to the transparent electrode 16 at the display substrate 18 side.

For example, as shown in FIG. 4, on the basis of the image for display which is stored in the image storage section 44, the controller 42 determines whether or not cyan is to be displayed (100). If cyan is to be displayed, the application voltage V (−Vc') is applied between the substrates (102).

Further, it is determined whether or not blue is to be displayed (104). If blue is to be displayed, the application voltage V (−Vc') is applied between the substrates (106), and thereafter, the application voltage V (Vm') is applied between the substrates (108), and thereafter, the application voltage V (−Vy') is applied between the substrates (110).

Moreover, it is determined whether or not green is to be displayed (112). If green is to be displayed, the application voltage V (−Vc') is applied between the substrates (114), and thereafter, the application voltage V (Vy') is applied between the substrates (116).

Further, it is determined whether or not black or grey is to be displayed (118). If black or grey is to be displayed, the application voltage V (−Vc') is applied between the substrates (120), and thereafter, the application voltage V (Vm') is applied between the substrates (122).

Moreover, it is determined whether or not yellow is to be displayed (124). If yellow is to be displayed, the application voltage V (Vc') is applied between the substrates (126), and thereafter, the application voltage V (−Vm') is applied between the substrates (128), and thereafter, the application voltage V (Vy') is applied between the substrates (130).

Further, it is determined whether or not no display is to be carried out (132). If no display is to be carried out, the application voltage V (Vc') is applied between the substrates (134), and thereafter, the application voltage V (−Vm') is applied between the substrates (136).

Moreover, it is determined whether or not magenta is to be displayed (138). If magenta is to be displayed, the application voltage V (Vc') is applied between the substrates (140), and thereafter, the application voltage V (−Vy') is applied between the substrates (142).

On the other hand, if magenta is not to be displayed nor any of the aforementioned colors, it is determined that red is to be displayed, and the application voltage V (Vc') is applied between the substrates (144).

Namely, in the exemplary embodiment, by applying, between the substrates, the voltage which has the largest absolute value of the voltage range which is largest among the voltage ranges required in order for the respective colored particles to move, the three types of colored particles 32 move toward the substrates corresponding to the respective polarities thereof. Therefore, by using this as a reference, the voltages which are required in order for the respective colored particles to move are applied. In this way, as compared with a case in which driving is carried out from a state in which the respective colored particles 32 are being all mixed together, there is little interaction, and control of the movement of the respective colored particles 32 is easy. Accordingly, as compared with a case in which driving is carried out from a state in which the respective colored particles 32 are being all mixed together, colors are displayed with color mixing suppressed.

Further, even in a case in which, from a state in which the respective colored particles 32 were disposed so as to be mixed together, driving were to be selectively carried out at a voltage within the voltage range required for moving one type of the colored particles 32, electrostatic force which pushes the colored particles against a substrate would be applied to at least one type of the colored particles which was not selected.

Although gradation display is not mentioned in particular in the above, because the display density is changed as shown in FIG. 2 by selecting a voltage within the voltage range in which the corresponding type of colored particle moves, the gradations of the respective colors can be controlled by selecting the voltages appropriately. For example, to explain a method of display in a case in which gradation of cyan is to be displayed, firstly, application voltage (−Vc') is applied and cyan is displayed, and thereafter, application voltage between $Vc \leq V \leq Vc'$ is applied in accordance with the gradation for which display is desired. At this time, because the magenta particles 32M and the yellow particles 32Y move toward the display substrate 18 side, by applying application voltage −Vm', the magenta particles 32M and the yellow particles 32Y are returned to the back surface substrate 28 side, and cyan gradation can be displayed. Or, cyan gradation can be displayed even if application voltage Vc' is applied and the cyan particles are moved toward the back surface substrate side (i.e., red is displayed), and thereafter, a voltage of $-Vc' \leq V \leq -Vc$ is applied in accordance with the gradation for which display is desired. Further, although an example of the gradation display method has been described, gradation display of the respective colors is possible by appropriately selecting and applying the application voltages, and therefore, gradation may be displayed by another gradation display method.

Further, in the above-described first exemplary embodiment, there is described an example in which the magnitudes of the absolute values of the voltage ranges are set to be in the order of the cyan particles 32C the magenta particles 32M and the yellow particles 32Y, and the cyan particles 32C whose absolute values of the voltage range are the largest are made to be the opposite polarity of the other colored particles 32. However, the embodiment is not limited to the same. For example, the magnitudes of the absolute values of the voltage ranges may be set to be in the order of the yellow particles 32Y, the magenta particles 32M and the cyan particles 32C, and the magenta particles 32M which are second in the order of the magnitudes of the absolute values of the voltage ranges may be made to be the polarity opposite the other colored particles 32. Or, the magnitudes of the absolute values of the voltage ranges may be set to be in the order of the cyan particles 32C, the magenta particles 32M and the yellow particles 32Y, and the yellow particles 32Y which have the smallest absolute values of the voltage ranges may be made to be opposite polarity of the other colored particles 32. Or, the magnitudes of the absolute values of the voltage ranges may be set to be in another order, and at least one type be made to be the opposite polarity.

Here, description will be given of driving control of the image display device in a case in which the magnitudes of the absolute values of the voltage ranges are set in the order of the yellow particles 32Y, the magenta particles 32M and the cyan particles 32C, and the magenta particles 32M which are second in the order of the magnitudes of the absolute values of the voltage ranges are made to be the opposite polarity of the other colored particles 32 (are made to be negative polarity).

First, when the voltage application section 40 applies the application voltage V (−Vy'), which has the largest absolute values of the voltage ranges required in order to move the respective particles, between the transparent electrode 16 and the electrode 22 due to the control of the controller 42, the yellow particles 32Y and the cyan particles 32C which are positively polarized move to the display substrate 18 side, and the magenta particles 32M which are negatively polarized move to the back surface substrate 28 side. The state (1) in FIG. 5 thereby arises, and green, which is a subtractive color mixture of yellow and cyan, is displayed.

Further, when the voltage application section 40 applies the application voltage V (Vy'), which has the largest absolute values of the voltage ranges required in order to move the respective particles, between the transparent electrode 16 and the electrode 22 due to the control of the controller 42, the magenta particles 32M which are negatively polarized move to the display substrate 18 side, and the yellow particles 32Y and the cyan particles 32C which are positively polarized move to the back surface substrate 28 side. The state (2) in FIG. 5 thereby arises, and magenta is displayed.

Figure 5:
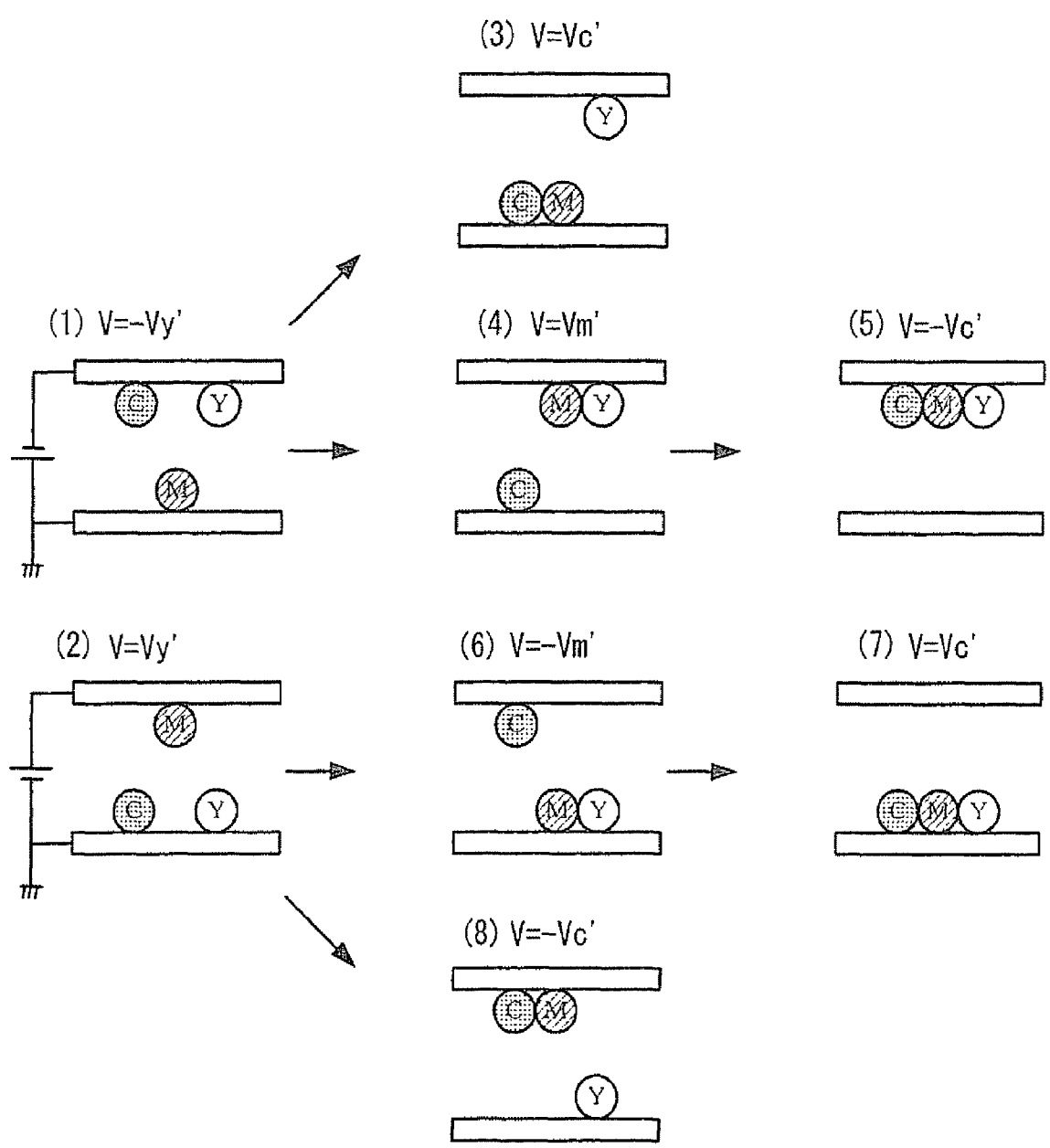
FIG. 5 is a drawing for explaining, in the first exemplary embodiment, driving control in a case in which the magnitudes of the absolute values of the voltage ranges are set in the order of yellow particles, magenta particles, and cyan particles, and the magenta particles, which are second in order of the magnitudes of the absolute values of the voltage ranges, are made to be the opposite polarity of the other colored particles.

Moreover, from the state (1) in FIG. 5 (the green display state), due to the voltage application section 40 applying the application voltage V (Vc') between the transparent substrate 16 and the electrode 22 due to the control of the controller 42, the cyan particles 32C move to the back surface substrate 28 side. The state (3) in FIG. 5 thereby arises, and yellow is displayed.

Further, from the state (1) in FIG. 5 (the green display state), due to the voltage application section 40 applying the application voltage V (Vm') between the transparent substrate 16 and the electrode 22 due to the control of the controller 42, the magenta particles 32M move to the display substrate 18 side, and the cyan particles 32C move to the back surface substrate 28 side. The state (4) in FIG. 5 thereby arises, and red, which is a subtractive color mixture of magenta and yellow, is displayed.

Further, from the state (4) in FIG. 5 (the red display state), due to the voltage application section 40 applying the application voltage V (−Vc') between the transparent substrate 16 and the electrode 22 due to the control of the controller 42, the cyan particles 32C move to the display substrate 18 side. The state (5) in FIG. 5 thereby arises, and black or grey, which is a subtractive color mixture of cyan, magenta and yellow, is displayed.

Further, from the state (2) in FIG. 5 (the magenta display state), due to the voltage application section 40 applying the application voltage V (−Vm') between the transparent substrate 16 and the electrode 22 due to the control of the controller 42, the magenta particles 32M move to the back surface substrate 28 side, and the cyan particles 32C move to the display substrate 18 side. The state (6) in FIG. 5 thereby arises, and cyan is displayed.

Moreover, from the state (6) in FIG. 5 (the cyan display state), due to the voltage application section 40 applying the application voltage V (Vc') between the transparent substrate 16 and the electrode 22 due to the control of the controller 42, the cyan particles 32C move to the back surface substrate 28 side. The state (7) in FIG. 5 thereby arises, and a non-display state arises. Note that, at this time, if the dispersion liquid 24 is colored, the color of the dispersion liquid 24 is displayed. For example, if the dispersion liquid 24 is colored to white, white display becomes possible.

Further, from the state (2) in FIG. 5 (the magenta display state), due to the voltage application section 40 applying the application voltage V (−Vc') between the transparent substrate 16 and the electrode 22 due to the control of the controller 42, the cyan particles 32C move to the display substrate 18 side. The state (8) in FIG. 5 thereby arises, and blue, which is a subtractive color mixture of cyan and magenta, is displayed.

Next, description will be given of driving control in a case in which the magnitudes of the absolute values of the voltage ranges are set in the order of the cyan particles 32C, the magenta particles 32M and the yellow particles 32Y, and the yellow particles 32Y which have the smallest absolute values of the voltage ranges are made to be the opposite polarity of the other colored particles 32 (are made to be negative polarity).

First, when the voltage application section 40 applies the application voltage V (−Vc'), which has the largest absolute values of the voltage ranges required in order to move the respective particles, between the transparent electrode 16 and the electrode 22 due to the control of the controller 42, the cyan particles 32C and the magenta particles 32M which are positively polarized move to the display substrate 18 side, and the yellow particles 32Y which are negatively polarized move to the back surface substrate 28 side. The state (1) in FIG. 6 thereby arises, and blue, which is a subtractive color mixture of cyan and magenta, is displayed.

Further, when the voltage applying section 40 applies the application voltage V (Vc'), which has the largest absolute values of the voltage ranges required in order to move the respective particles, between the transparent electrode 16 and the electrode 22 due to the control of the controller 42, the yellow particles 32Y which are negatively polarized move to the display substrate 18 side, and the cyan particles 32C and the magenta particles 32M which are positively polarized move to the back surface substrate 28 side. The state (2) of FIG. 6 thereby arises, and yellow is displayed.

Figure 6:
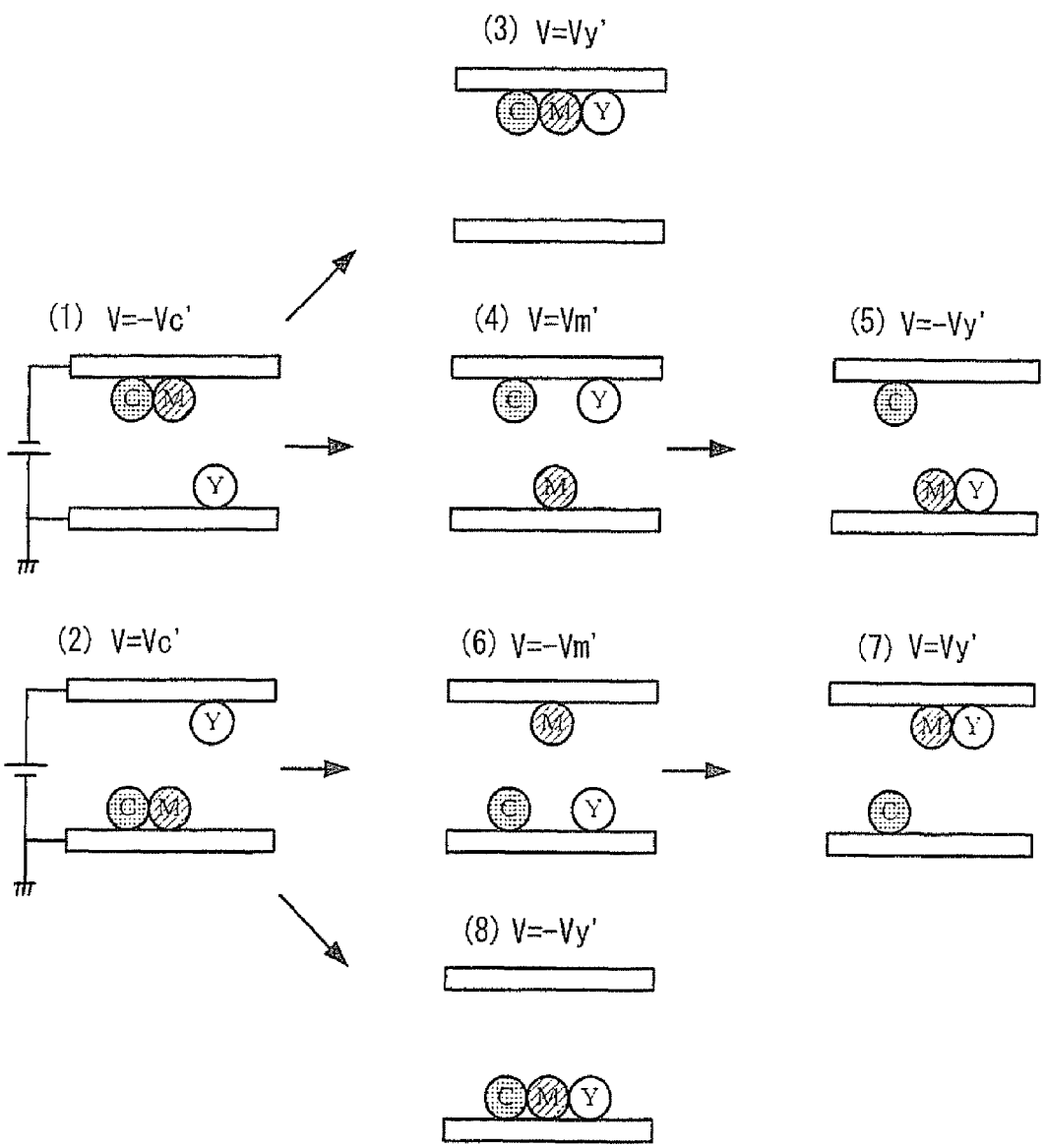
FIG. 6 is a drawing for explaining, in the first exemplary embodiment, driving control in a case in which the magnitudes of the absolute values of the voltage ranges are set in the order of the cyan particles, the magenta particles, and the yellow particles, and the yellow particles, which have the smallest absolute values of the voltage ranges, are made to be the opposite polarity of the other colored particles.

Moreover, from the state (1) in FIG. 6 (the blue display state), due to the voltage application section 40 applying the application voltage V (Vy') between the transparent substrate 16 and the electrode 22 due to the control of the controller 42, the yellow particles 32Y move to the display substrate 18 side. The state (3) in FIG. 6 thereby arises, and black or grey, which is a subtractive color mixture of cyan, magenta and yellow, is displayed.

Further, from the state (1) in FIG. 6 (the blue display state), due to the voltage application section 40 applying the application voltage V (Vm') between the transparent substrate 16 and the electrode 22 due to the control of the controller 42, the magenta particles 32M move to the back surface substrate 28 side, and the yellow particles 32Y move to the display substrate 18 side. The state (4) in FIG. 6 thereby arises, and green, which is a subtractive color mixture of cyan and yellow, is displayed.

Moreover, from the state (4) in FIG. 6 (the green display state), due to the voltage application section 40 applying the application voltage V (−Vy') between the transparent substrate 16 and the electrode 22 due to the control of the controller 42, the yellow particles 32Y move to the back surface substrate 28 side. The state (5) in FIG. 6 thereby arises, and cyan is displayed.

Further, from the state (2) in FIG. 6 (the yellow display state), due to the voltage application section 40 applying the application voltage V (−Vm') between the transparent substrate 16 and the electrode 22 due to the control of the controller 42, the magenta particles 32M move to the display substrate 18 side, and the yellow particles 32Y move to the back surface substrate 28 side. The state (6) in FIG. 6 thereby arises, and magenta is displayed.

Moreover, from the state (6) in FIG. 6 (the magenta display state), due to the voltage application section 40 applying the application voltage V (Vy') between the transparent substrate 16 and the electrode 22 due to the control of the controller 42, the yellow particles 32Y move to the display substrate 18 side. The state (7) in FIG. 6 thereby arises, and red, which is a subtractive color mixture of magenta and yellow, is displayed.

Further, from the state (2) in FIG. 6 (the yellow display state), due to the voltage application section 40 applying the application voltage V (−Vy') between the transparent substrate 16 and the electrode 22 due to the control of the controller 42, the yellow particles 32Y move to the back surface substrate 28 side. The state (8) in FIG. 6 thereby arises, and a non-display state arises. Note that, at this time, if the dispersion liquid 24 is colored, the color of the dispersion liquid 24 is displayed. For example, if the dispersion liquid 24 is colored to white, white display becomes possible.

Second Exemplary Embodiment

Figure 7:
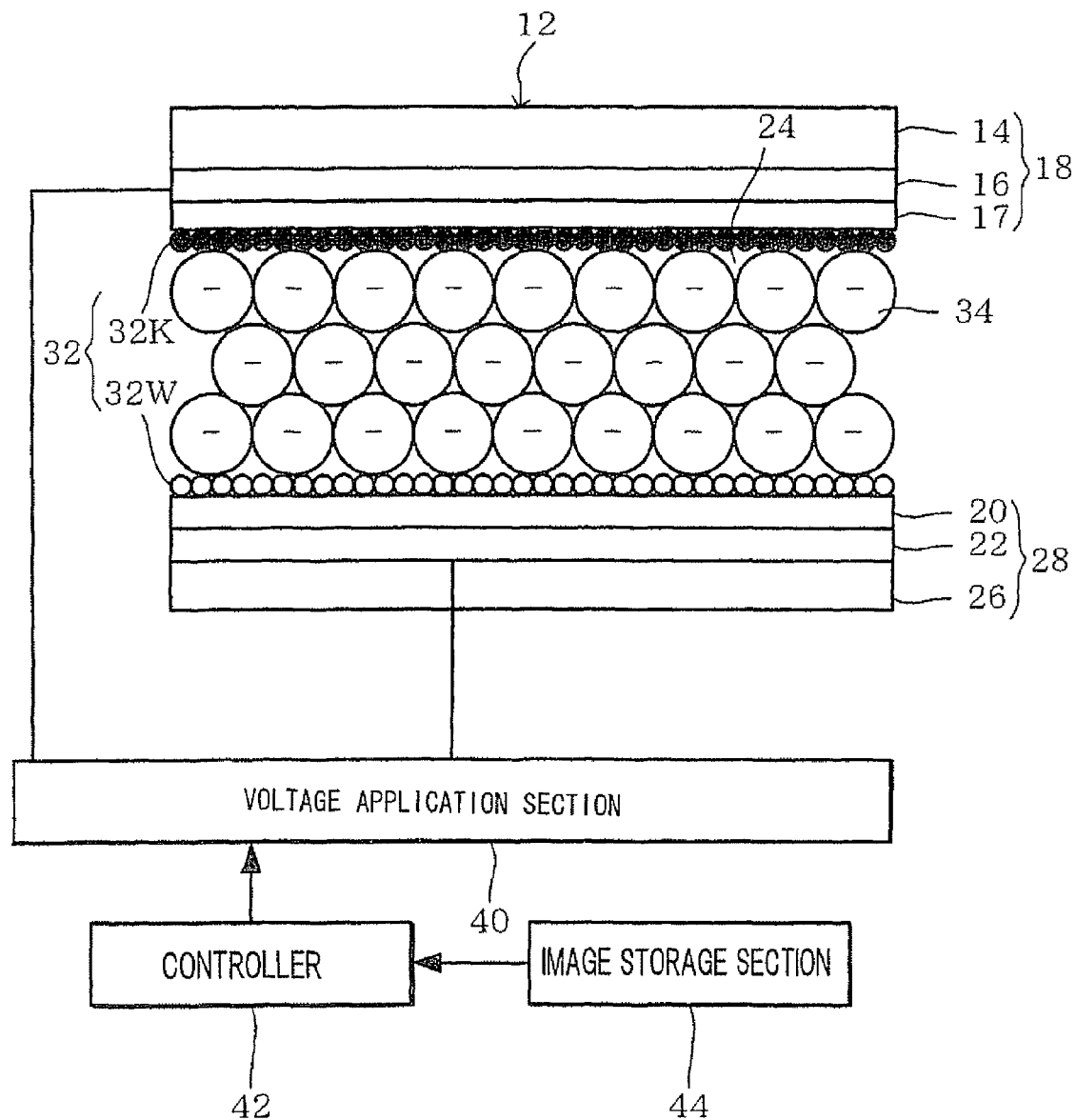
FIG. 7 is a drawing showing the structure of an image display device relating to a second exemplary embodiment.

An image display device relating to a second exemplary embodiment will be described next. FIG. 7 is a drawing showing the structure of the image display device relating to the second exemplary embodiment.

In the first exemplary embodiment, description is given of a case in which three types of the colored particles 32 of the same size are enclosed between substrates and respectively move between the substrates. In the second exemplary embodiment, one type of colored particles among the three types of colored particles is made to be large-diameter colored particles 34 whose particle diameter is greater than the other colored particles 32, and the colored particles 32 other than the large-diameter colored particles 34 move between the substrates. In the following description, only points which are different from the first exemplary embodiment will be explained.

In the second exemplary embodiment, the large-diameter colored particles 34 are colored to white, and the colored particles 32 are white particles 32W and black particles 32K. However, the embodiment is not limited to the same, and the particles may be colored to other colors.

Particles whose particle diameters are larger than the colored particles 32 are used as the large-diameter colored particles 34. The colored particles 32 must pass through the spaces between the large-diameter colored particles 34. Therefore, particles whose particle diameter is 10 times or more (and preferably 20 times or more) greater than the colored particles 32 can be used as the large-diameter colored particles 34. However, because the large-diameter colored particles 34 are enclosed between the substrates, the particle diameter thereof is smaller than the distance between the substrates.

In cases in which the diameters of the colored particles 32 are substantially uniform, it suffices for the size of the large-diameter colored particles 34 to be 10 times or more greater than the colored particles 32. However, in cases in which there is dispersion in the diameters of the colored particles 32 and larger colored particles 32 are included, the size of the large-diameter colored particles 34 being 20 times or more greater eliminates clogging of the colored particles 32 between the large-diameter colored particles 34. Note that, in the exemplary embodiment, "substantially uniform" means that the dispersion in particle diameters is small. For example, dispersion which is about ±50% of the average particle diameter is "substantially uniform". (In a case in which the average particle diameter is 1 μm, substantially all of the particles fall between 0.5 μm to 1.5 μm. For "substantially all", a standard deviation of 2σ (95.4%) for example can be used as the standard.)

If the particle diameter of the large-diameter colored particles 34 is too small, there are cases in which spaces between the particles, through which the colored particles 32 can move, cannot be sufficiently ensured. Further, if the particle diameter is too large, the space between the substrates becomes large, and there are cases in which the structure becomes high voltage and a decrease in the display speed arises. Note that, if the volume average particle diameter of the large-diameter colored particles 34 is around 10 μm, colored particles 32 of a volume average particle diameter of from several tens of nm to several hundred nm can move through the spaces between the large-diameter colored particles 34.

For example, particles in which a white pigment such as titanium oxide, silicon oxide, zinc oxide, or the like is dispersed in polystyrene, polyethylene, polypropylene, polycarbonate, PMMA (polymethylmethacrylate), an acrylic resin, a phenol resin, a formaldehyde condensate, or the like can be used as the large-diameter colored particles 34. Further, resin particles which contain, for example, a pigment or a dye of the desired color as the color of the large-diameter colored particles 34 can be used. For the pigment or dye, for example, a general pigment or dye which is used in printing inks or color toners can be used.

The enclosing of the large-diameter colored particles 34 between the substrates is carried out by, for example, an electrophotographic method, a toner jetting method, or the like. Further, in a case of fixing the large-diameter colored particles 34, the fixing can be carried out while maintaining the spaces between the particles by, for example, enclosing the large-diameter colored particles 34, and thereafter, carrying out heating (and pressurizing if needed), and softening the particle group surface layers of the large-diameter colored particles 34 and fusing them together.

Note that the disclosure of JP-A No. 2001-312225 for example can be applied for the respective members structuring the image display medium.

Even after the application of voltage between the substrates is stopped, the colored particles 32 are maintained in the state of the time when the voltage was applied, due to van der Waals force and image forces.

Further, in the exemplary embodiment, the large-diameter colored particles 34 which are colored white have a charge characteristic which is the opposite polarity of the colored particles 32 which are the same color as the large-diameter colored particles 34, or a charge characteristic which is the same polarity as the colored particles 32 which are a different color than the large-diameter colored particles 34.

In the exemplary embodiment, the white particles 32W have a positive charge characteristic, and the large-diameter colored particles 34, which are the same color as the white particles 32W, have a negative charge characteristic which is the opposite polarity of the white particles 32W. Note that the black particles 32K may have a negative charge characteristic, and the large-diameter colored particles 34 may be polarized negatively which is the same polarity as the black particles 32K. Further, FIG. 7 shows a state in which the large-diameter colored particles 34 are negatively polarized.

Next, an example of display driving control of the image display device, which relates to the second exemplary embodiment and is structured as described above, will be described. Note that, hereinafter, in order to simplify explanation, description will be given of the electrode 22 at the back surface substrate 28 side being ground (0 V) and voltage being applied to the transparent electrode 16 at the display substrate 18 side. Further, in the display driving control of the exemplary embodiment, white or black display is carried out by applying a positive or negative predetermined voltage between the transparent substrate 16 and the electrode 22.

In the second exemplary embodiment, when the voltage application section 40 applies a positive predetermined voltage between the transparent substrate 16 and the electrode 22 due to the control of the controller 42, the white particles 32W which are negatively polarized move to the back surface substrate 28 side and the black particles 32K which are positively polarized move to the display substrate 18 side, such that the state shown in FIG. 7 arises. Accordingly, the black particles 32K can be observed from the display substrate 18 side, and black is displayed.

On the other hand, when the voltage application section 40 applies a negative predetermined voltage between the transparent substrate 16 and the electrode 22 due to the control of the controller 42, the black particles 32K which are positively polarized move to the back surface substrate 28 side and the white particles 32W which are negatively polarized move to the display substrate 18 side. In this way, the white particles 32W can be observed from the display substrate 18 side, and white is displayed.

In the second exemplary embodiment, the white particles 32W, which are the same color as the large-diameter colored particles 34, have the opposite polarity. Therefore, due to the electrostatic attraction between the white particles 32W and the large-diameter colored particles 34, the white particles 32W which have peeled away from the substrate surface are held at the surfaces of the nearby large-diameter colored particles 34 which are colored to the same white color, and color mixing is suppressed and the image maintainability is improved.

Further, because the black particles 32K, which are a different color than the large-diameter colored particles 34, have the same polarity, due to electrostatic repulsion, the black particles 32K which are a different color can be prevented from adhering to the surfaces of the large-diameter colored particles 34. Moreover, due to the electrostatic repulsion between the black particles 32K and the surfaces of the large-diameter colored particles 34, force which pushes the black particles 32K against the substrate surface acts on the black particles 32K which are the same polarity as the large-diameter colored particles 34, and color mixing is suppressed and the image maintainability is improved.

Figure 8:
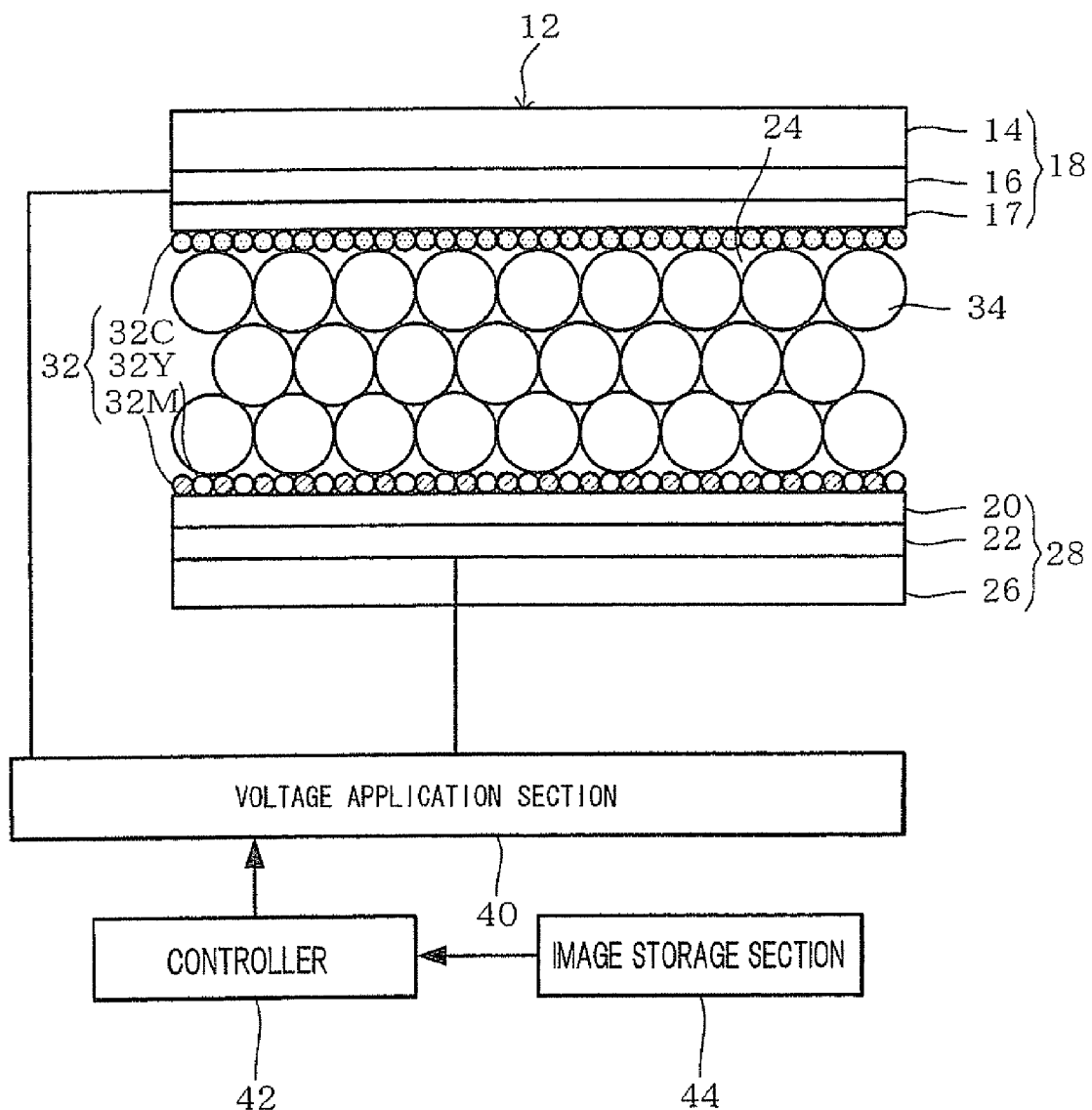
FIG. 8 is a drawing showing a case in which another one type of colored particles are enclosed between substrates in the image display device relating to the second exemplary embodiment.

Note that with the large-diameter colored particles 34 of the exemplary embodiment, another one type of the colored particles 32 may be enclosed between the substrates as shown in FIG. 8. Namely, the large-diameter colored particles 34 may be enclosed between the substrates of the image display device of the first exemplary embodiment which has the three types of colored particles 32. The display driving control in this case can be made to be similar to that of the first exemplary embodiment. At this time, the large-diameter colored particles 34 may be a color other than white, and may be unpolarized particles. Further, other colors than the first exemplary embodiment may be appropriately used as the colors of the three types of colored particles 32.

Figure 9:
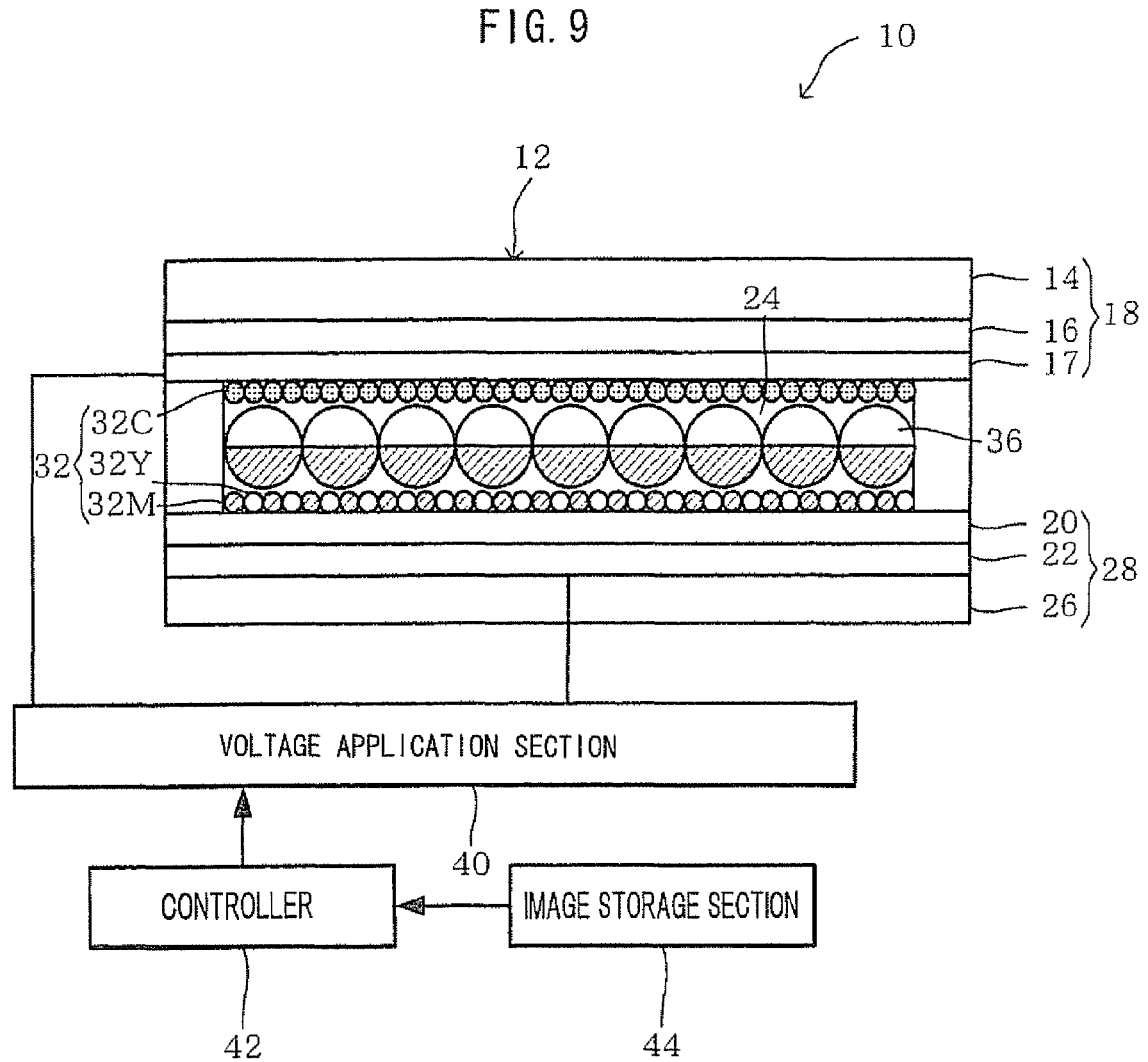
FIG. 9 is a drawing showing an example in which multicolor particles, which are each painted two or more colors, are used instead of large-diameter colored particles.

Further, in the exemplary embodiment, as shown in FIG. 9, multicolor particles which are painted two or more colors (in FIG. 9, bicolor particles 36 which are painted two colors) may be used instead of the large-diameter colored particles 34. At this time, the bicolor particles 36 may be the same colors as the colors of the colored particles 32, or may be different colors. Further, the bicolor particles 36 may be painted such that the surface areas which are painted in the two colors are respectively different surface areas, or same surface areas. Still further, at least a portion of the bicolor particle 36 which is offset from the center of gravity has positive or negative polarity, and the bicolor particle 36 rotates in accordance with the electric field which is applied between the substrates.

In the same way as the large-diameter colored particles 34, particles whose particle diameters are larger than the colored particles 32 are used as the bicolor particles 36, and the colored particles 32 must move through the spaces between the bicolor particles 36. Therefore, particles whose particle diameter is 10 times or more (and preferably 20 times or more) greater than the colored particles 32 are used as the bicolor particles 36. However, because the bicolor particles 36 are enclosed between the substrates, the particle diameter thereof is smaller than the distance between the substrates. In cases in which the diameters of the colored particles 32 are substantially uniform, it suffices for the size of the bicolor particles 36 to be 10 times or more greater than that of the colored particles 32. However, in cases in which there is dispersion in the diameters of the colored particles 32 and larger colored particles 32 are included, the size of the bicolor particles 36 being 20 times or more greater eliminates clogging of the colored particles 32 between the bicolor particles 36. If the particle diameter of the bicolor particles 36 is too small, there are cases in which spaces between the particles, through which the colored particles 32 can move, cannot be sufficiently ensured. Further, if the particle diameter is too large, the space between the substrates becomes large, and there are cases in which the structure becomes high voltage and a decrease in the display speed arises. Note that, if the volume average particle diameter of the bicolor particles 36 is around 10 μm, the colored particles 32 of a volume average particle diameter of from ten nm to several hundred nm can move through the spaces between the bicolor particles 36.

If the size of the bicolor particles 36 is too small, it becomes difficult to obtain the rotational force which is due to the electric field between the substrates, and the application voltage required to rotate the bicolor particles 36 becomes extremely large. For example, in order to drive the bicolor particles 36 at an application voltage of several tens of V, a size of greater than or equal to 10 μm is required. Further, if the size of the bicolor particles 36 is too large, the distance between the substrates becomes large, and the application voltage becomes high just the same. In consideration thereof, the size of the bicolor particles 36 may set to a size of 10 μm to 100 μm. Note that the volume average particle diameter of the multicolor particles (the bicolor particles 36 in FIG. 9) is measured by the Laser Scattering Particle Size Distribution Analyzer LA-920 manufactured by Horiba, Ltd.

Note that, because the transparence of the bicolor particles 36 is low, from the standpoint of the ability to generate color, the bicolor particles 36 may be positioned at the back surface side of the colored particles as seen from the display substrate side, rather than being mixed-in together among the colored particles 32. If the bicolor particles 36 are made to be larger than the colored particles 32 and the colored particles 32 move through the spaces between the bicolor particles 36, the colored particles 32 can be moved to the display substrate surface and the bicolor particles 36 can be disposed behind them. Further, in the case of actually driving and rotating the bicolor particles 36, a driving voltage which is much higher than that for moving the colored particles 32 is required. However, if the bicolor particles 36 are made to be large, a large rotational moment is obtained. Therefore, making the bicolor particles 36 large is effective in lowering the driving voltage and in improving the display ability and the reliability.

For the white portions of the bicolor particles 36, there can be used particles in which a white pigment such as, for example, titanium oxide, silicon oxide, zinc oxide, or the like is dispersed in polystyrene, polyethylene, polypropylene, polycarbonate, PMMA, an acrylic resin, a phenol resin, a formaldehyde condensate, or the like. For the chromatic portions of the bicolor particles 36, for example, if the color is a color among RGB or YMC, a general pigment or dye which is used in printing inks or color toners can be used.

The enclosing of the bicolor particles 36 between the substrates is carried out by, for example, an electrophotographic method, a toner jetting method or the like. Further, members disclosed in JP-A No. 2001-312225 for example can be used as the respective members structuring the image display medium.

By making the voltage range (absolute values) required in order to rotate the bicolor particles 36 and the voltage ranges (absolute values) required in order to move the respective colored particles 32 be respectively different characteristics, each of the types of particles can be driven independently of one another. By making the voltage range (absolute values) required for the bicolor particles 36 to rotate greater than the voltage ranges (absolute values) required for the respective colored particles to move, and by carrying out display control by using, as the reference state, the state in which a voltage required to rotate the bicolor particles 36 is applied, display driving is stable as compared with a case in which this structure is not employed. Note that the application voltages required in order for the three types of colored particles 32 to move can be controlled by, for example, the charge amount, the particle diameter, or the shape or properties of the particle surface, or the like. Further, the application voltage required in order for the bicolor particles 36 to rotate can be controlled by the charge amount, the particle diameter, the viscosity of the solvent, or the like. The "voltage range required to rotate the bicolor particles" means a voltage range from the voltage required in order for the particles to start rotating, up to a voltage at which, when the voltage and the voltage application time are further increased from the start of rotation, no change arises in the display density and the display density is saturated. Further, the method of measuring the display density is as described in the case of the colored particles of the first exemplary embodiment.

In order to respectively drive the three types of colored particles 32 and the bicolor particles 36 independently, the voltage ranges required to move (or to rotate) substantially all of the respective particles are set so as to not overlap one another. In this way, the respective colored particles 32 and the bicolor particles 36 can be driven independently. The respective colors can be displayed by selectively applying, between the substrates, voltages required for the three types of colored particles 32 to move and voltage required for the bicolor particles to rotate, by using, as the reference, a state in which the maximum voltage is applied between the substrates, among the voltage ranges required in order for the three types of colored particles 32 to move and the voltage range required in order for the bicolor particles 36 to rotate. Note that "substantially all" means that, because there is dispersion in the characteristics of the colored particles 32 and the bicolor particles 36, the characteristics of some of the colored particles 32 differ to an extent of not contributing to the display characteristic. Namely, when the voltage and the voltage application time are further increased from the start of movement of the particles, there is a state in which no change arises in the display density and the display density is saturated.

Further, "maximum voltage of the voltage range required in order for the multicolor particles to rotate" means a voltage at which, when the voltage and the voltage application time are further increased from the aforementioned start of rotation, no change arises in the display density and the display density is saturated.

Figure 10:
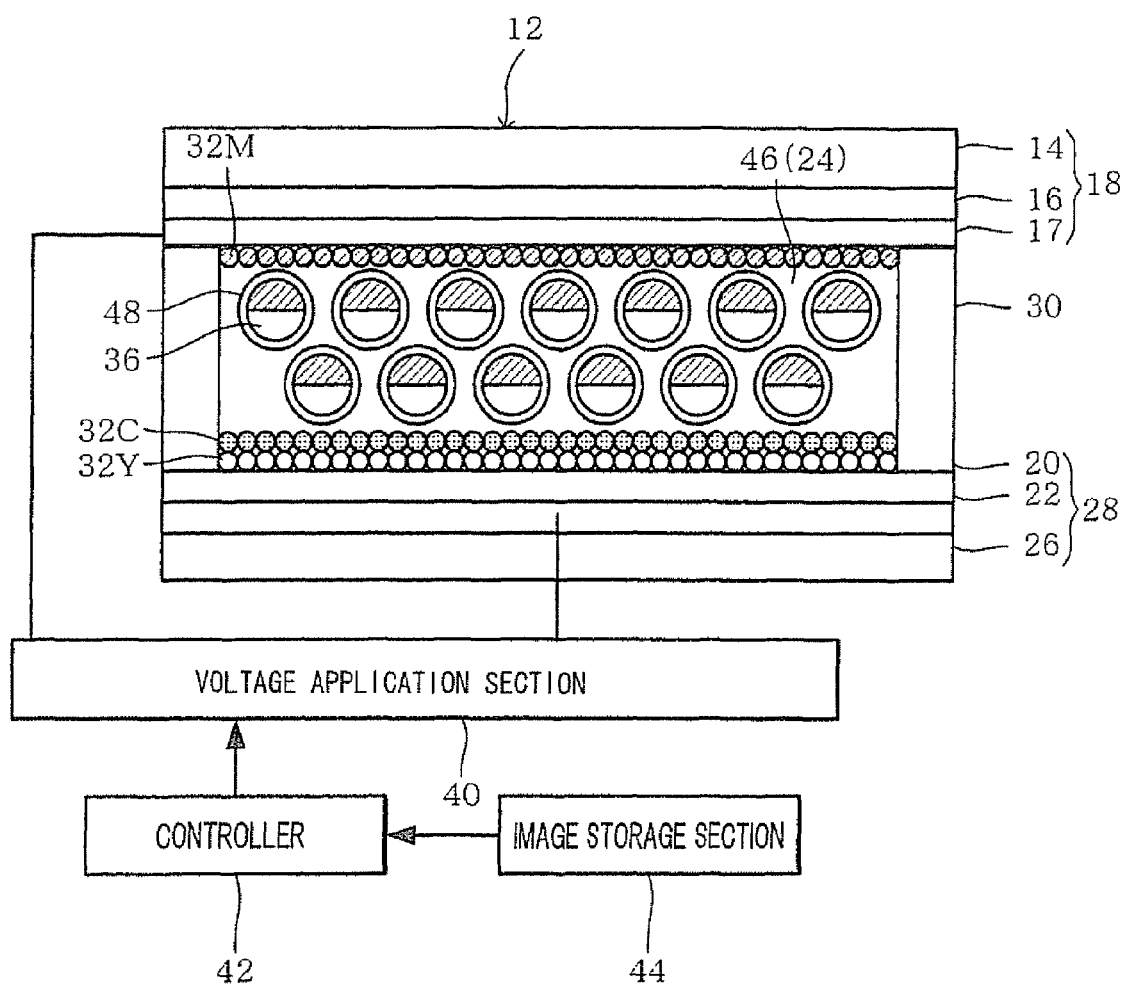
FIG. 10 is a drawing showing an example in which a porous body, which is structured by silicone rubber in which a migration liquid such as silicone oil or the like is filled, is used instead of the dispersion liquid.

As shown in FIG. 10, a porous body 46, which is structured of silicone rubber or the like and in which a migration liquid such as silicone oil or the like is filled, may be applied to the image display medium of FIG. 9 instead of the dispersion liquid 24. In this case, the porous body 46 can be produced by, for example, kneading the bicolor particles 36 in an elastomer which contains a liquid silicone rubber, and thereafter, gelling and fixing, and thereafter, enclosing a silicone oil in which the colored particles 32 are dispersed. Further, minute cavities 48, which are of a size that does not impede the rotational motion of the bicolor particles 36, are formed at the peripheries of the bicolor particles 36. The porous body 46 has a mesh structure having openings of sizes through which the colored particles 32 can move. In this way, the colored particles 32 can move between the substrates through these openings that are filled with the migration liquid.

Figure 11:
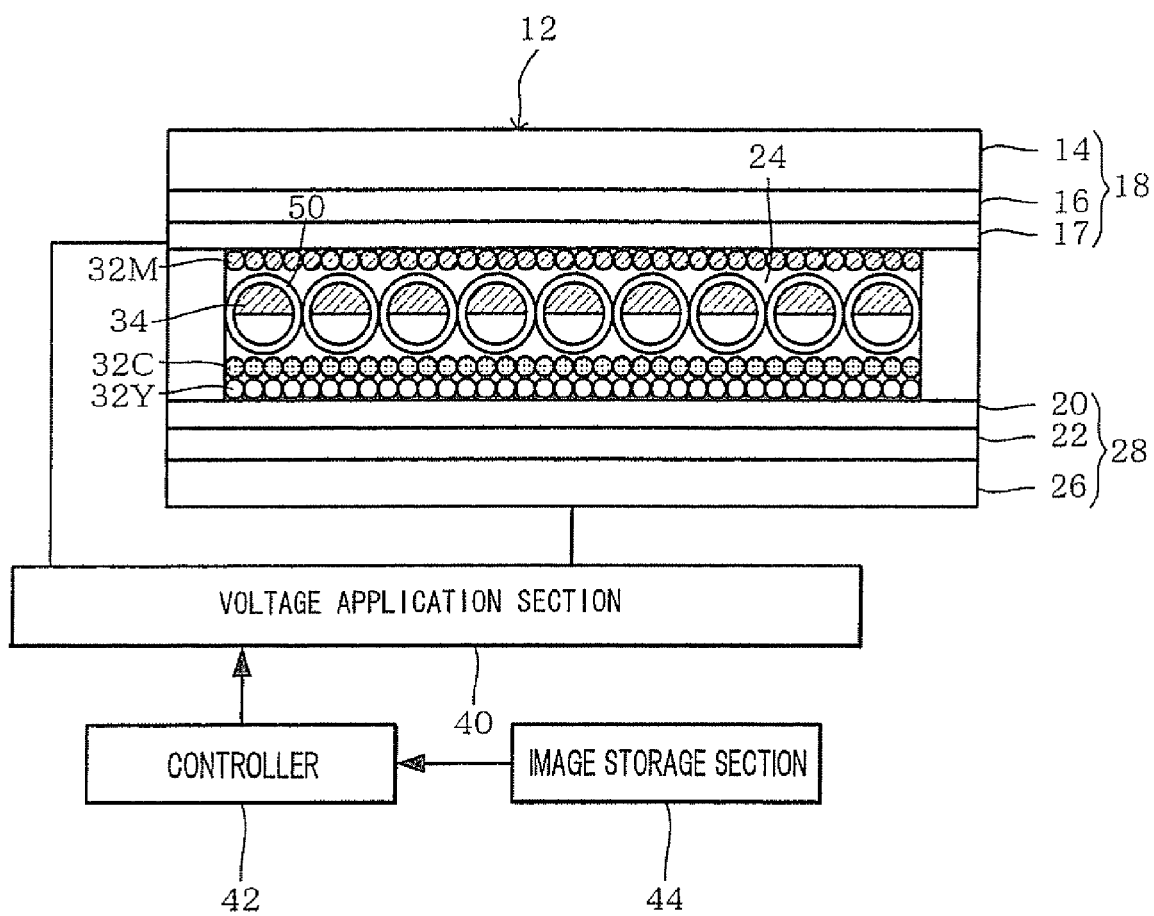
FIG. 11 is a drawing showing an example in which bicolor particles are enclosed, in rotatable states, in transparent capsules which are filled with a transparent encapsulated migration liquid.

Moreover, as shown in FIG. 11, the bicolor particles 36 of the image display medium of FIG. 9 may be enclosed in a rotatable state in transparent capsules 50 which are filled with a transparent, encapsulated migration liquid. In this case, the application voltages for moving the colored particles 32 and the application voltage for rotating the bicolor particles 36 can be adjusted by selecting the respective compositions and viscosities of the dispersion liquid 24 between the substrates and the encapsulated migration liquid.

Figure 12A:
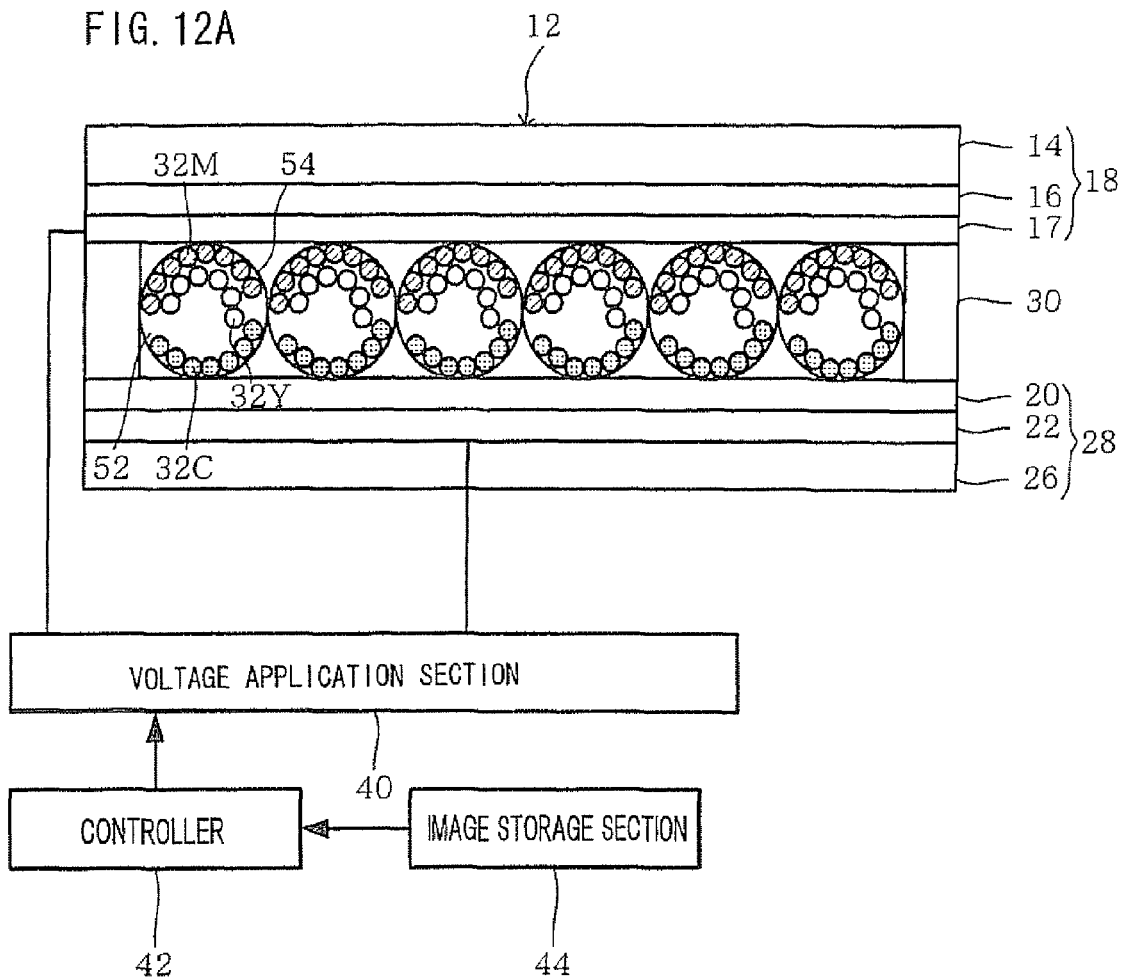
FIGS. 12A and 12B are drawings showing examples in which colored particles and bicolor particles are enclosed in transparent capsules.
Figure 12B:
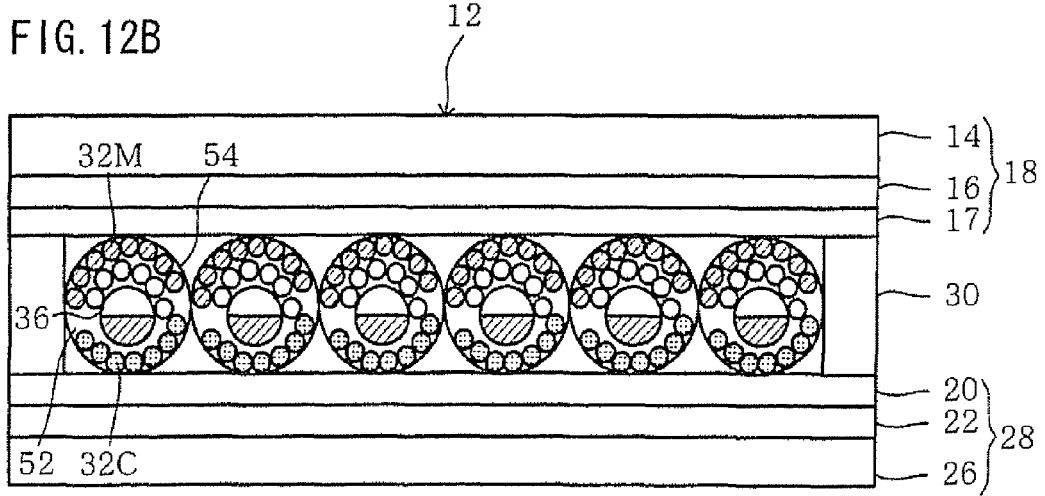

Note that, although three types of the colored particles 32 are enclosed in the dispersion liquid 24 between the substrates in the above-described first exemplary embodiment, the embodiment is not limited to the same. For example, as shown in FIG. 12A, the colored particles 32 may be enclosed in transparent capsules 54 in which a migration liquid 52 is enclosed. Further, also in cases in which the bicolor particles 36 are included as well, as shown in FIG. 12B, the bicolor particles 36 also may be enclosed within the transparent capsules 54.

In the above second exemplary embodiment, the large-diameter colored particles 34 are described as an example of a reflecting member, but the embodiment is not limited to the same. For example, a resin sheet or a nonwoven fabric or the like may be used as a reflecting member. By using a resin sheet or a nonwoven fabric as the reflecting member, background colors such as white or the like can be displayed more uniformly than with the large-diameter colored particles 34, and the image display medium can be made to be more thin, and manufacturing is easy. Examples of materials structuring the resin sheet or nonwoven fabric include polyethylene, polystyrene, polyester, polyacryl, polypropylene, fluorinated resins such as polytetrafluoroethylene (PTFE), and the like. Polypropylene and PTFE resin can be particularly used because it is difficult for the colored particles 32 to adhere thereto. If a reflecting member 38 is structured by a nonwoven fabric, it suffices to structure the nonwoven fabric as an aggregation of fibers formed from these materials.

The porosity of the reflecting member can be made greater than or equal to 50% and less than or equal to 80% because both a good passage performance of the colored particles 32 passing through, and a good color generating ability of the image display medium 12 can be achieved. Further, the average hole diameter of the holes of the reflecting member through which the colored particles 32 pass is not particularly limited provided that it is a size such that the particles structuring the colored particles 32 can pass therethrough. However, the average particle diameter of the colored particles 32 is preferably within a range of greater than or equal to 1.2 times to less than or equal to 10,000 times the volume average primary particle diameter of the colored particles 32, and more preferably within a range of greater than or equal to 2 times to less than or equal to 1000 times. If the average hole diameter of the reflecting member is less than 1.2 times the volume average primary particle diameter of the colored particles 32, there are cases in which it is difficult for the respective particles which structure the colored particles 32 to move through the holes. If greater than 10,000 times, the problem of a deterioration in color generation may arise because the spaces become large.

If the reflecting member 38 is structured by a nonwoven fabric, the basis weight of the fibers structuring the nonwoven fabric may be within the range of greater than or equal to 10 $g/m^2$ and less than or equal to 100 $g/m^2$, and preferably the basis weight may be within the range of greater than or equal to 20 $g/m^2$ and less than or equal to 50 $g/m^2$, in order to make the passage rate of the colored particles 32 good and to make the thickness of the image display medium 12 thin. Further, the diameters of the fibers structuring the nonwoven fabric may be within a range of greater than or equal to 0.1 µm and less than or equal to 20 µm, and preferably greater than or equal to 0.1 µm and less than or equal to 3 µm, because a sufficient surface area is ensured and physical strength is ensured.

The foregoing description of the exemplary embodiments of the present invention has been provided for the purpose of illustration and description. It is not intended to be exhaustive or to limit the invention to the precise form disclosed herein. Obviously, many modifications and variations will be apparent to a practitioner skilled in the art. The exemplary embodiments were chosen and described in order to best explain the principles of the invention and its practical applications, thereby enabling others skilled in the art to understand the invention according to various embodiments and with various modifications as are suited to the particular use contemplated. It is intended that the scope of the invention be defined by the following claims and their equivalents.

What is claimed is:

1. An image display medium comprising:
   a pair of substrates at least one of that is light-transmissive;
   a liquid enclosed between the substrates:
   three or more types of colored particles dispersed in the liquid that move in accordance with electric fields applied between the substrates and have different colors and charge characteristics: and multicolor particles that are enclosed between the substrates and are shaped as rotatable bodies that rotate in accordance with an electric field applied between the substrates. and at least first portions of the multicolor particles offset from centers of gravity thereof have positive or negative polarity, and the first portions and at least second portions that are different from the first portions are respectively different colors, wherein at least one type of the colored particles have an opposite polarity from at least one other type of colored particles, and absolute values of voltages required in order for the respective colored particles to move, and an absolute value of a voltage required in order for the multicolor particles to rotate in accordance with the electric field, are respectively different.

2. The image display medium of claim 1, wherein the three or more types of colored particles move in accordance with the electric fields within predetermined voltage ranges, and the respective predetermined voltage range of each type of colored particle is set to a range that does not overlap ranges of the other type of colored particle.

3. The image display medium of claim 1, further comprising a reflecting member that is enclosed between the substrates and is colored a predetermined color.

4. The image display medium of claim 3, wherein the reflecting member is colored white.

5. The image display medium of claim 3, wherein the reflecting member comprises large-diameter particles that are larger than the colored particles.

6. The image display medium of claim 3, wherein the reflecting member is a nonwoven fabric.

7. The image display medium of claim 1, wherein the absolute value of the voltage required in order for the multicolor particles to rotate are greater than the absolute values of the voltages required in order for the respective colored particles to move.

8. The image display medium of claim 1, wherein an average volume particle diameter of the multicolor particles is greater than an average volume particle diameter of the colored particles.

9. The image display medium of claim 1, wherein the first portions of the multicolor particles are positively polarized, the at least second portions that are different from the first portions are negatively polarized and the multicolor particles are colored different colors at respective positively-/negatively-polarized regions.

10. The image display medium of claim 1, wherein the multicolor particles are rotatably enclosed in light-transmissive capsules that are filled with a light-transmissive liquid.

11. The image display medium of claim 1, wherein the liquid includes a porous body that is light-transmissive and within which a light-transmissive liquid is filled, the multicolor particles are rotatably housed within the porous body, and the colored particles pass between the substrates through holes of the porous body.

12. An image display device comprising:
an image display medium having a pair of substrates at least one of that is light-transmissive, a liquid enclosed between the substrates, and three or more types of colored particles dispersed in the liquid that move in accordance with electric fields applied between the substrates and have different colors and charge characteristics, at least one type of the colored particles having an opposite polarity from at least one other type of colored particles;

a voltage application section that applies a voltage between the substrates; and a controller that controls the voltage application section in accordance with image information, wherein the controller controls the voltage application section so as to selectively apply, between the substrates, respective voltages required in order for the three or more types of colored particles to move, by using as a reference a state in which voltage is applied between the substrates using a maximum voltage among the voltages required. in order for the three or more types of colored particles to move, the colored particles comprises:

(a) first particles colored a predetermined first color, and having positive or negative polarity, (b) second particles colored a second color that is different from the first color, and having an opposite polarity to the first particles, absolute values of voltages required in order for the second particles to move being smaller than absolute values of voltages required in order for the first particles to move, and (c) third particles colored a third color that is different from the first color and the second color. and having the opposite polarity to the first particles, absolute values of voltages required in order for the third particles to move being smaller than the absolute values of the voltages required in order for the first particles and the second particles to move, and the controller:

(1) controls the voltage application section so as to apply, between the substrates, a negative voltage required in order for the first particles to move, displays the first color when the first particles are positively-polarized, and displays a seventh color that is a subtractive color mixture of the second color and the third color when the first particles are negatively-polarized, (2) controls the voltage application section so as to apply, between the substrates. a positive voltage required in order for the third particles to move in a state in which the first color or the seventh color is displayed, displays a fourth color that is a subtractive color mixture of the first color and the third color when the first particles are positively-polarized, and displays the second color when the first particles are negatively-polarized, (3) controls the voltage application section so as to apply, between the substrates, a positive voltage required in order for the second particles to move in a state in which the first color or the seventh color is displayed. displays a fifth color that is a subtractive color mixture of the first particles, the second particles and the third particles when the first particles are positively-polarized, and displays an eighth color when the first particles are negatively-polarized, (4) controls the voltage application section so as to apply, between the substrates, a negative voltage required in order for the third particles to move in a state in which the fifth color or the eighth color is displayed, displays a sixth color that is a subtractive color mixture of the first particles and second particles when the first particles are positively-polarized, and displays the third color when the first particles are negatively-polarized, (5) controls the voltage application section so as to apply, between the substrates,a positive voltage required in order for the first particles to move, displays the seventh color when the first particles are positively-polarized, and displays the first color when the first particles are negatively-polarized, (6) controls the voltage application section so as to apply, between the substrates, a negative voltage required in order for the third particles to move in a state in which the seventh color or the first color is displayed, displays the second color when the first particles are positively-polarized, and displays the fourth color when the first particles are negatively-polarized, (7) controls the voltage application section so as to apply, between the substrates, a negative voltage required in order for the second particles to move in a state in which the seventh color or the first color is displayed, displays the eighth color when the first particles are positively-polarized, and displays the fifth color when the first particles are negatively-polarized, and (8) controls the voltage application section so as to apply, between the substrates, a positive voltage required in order for the third particles to move in a state in which the eighth color or the fifth color is displayed, displays the sixth color when the first particles are positively-polarized, and displays the third color when the first particles are negatively-polarized.

13. A image display device of comprising:
an image display medium having a pair of substrates at least one of that is light-transmissive, a liquid enclosed between the substrates, and three or more types of colored particles dispersed in the liquid that move in accordance with electric fields applied between the substrates and have different colors and charge characteristics, at least one type of the colored particles having an opposite polarity from at least one other type of colored particles;
a voltage application section that applies a voltage between the substrates;
a controller that controls the voltage application section in accordance with image information; and
multicolor particles that are enclosed between the substrates and are shaped as rotatable bodies that rotate in accordance with an electric field applied between the substrates, and at least first portions of the multicolor particles offset from centers of gravity of the multicolor particles are positive or negative polarity, and the first portions and at least second portions that are different from the first portions are respectively different colors, wherein,
when absolute values of voltages required in order for the respective colored particles to move, and an absolute value of a voltage required in order for the multicolor particles to rotate in accordance with an electric field, are respectively different, and
the controller controls the voltage application section to selectively apply, between the substrates, voltages required in order for the three or more types of the colored particles to move and a voltage required in order for the multicolor particles to rotate using as a reference a state in which a maximum voltage is applied between the substrates among the absolute values of the voltages required in order for the three or more types of colored particles to move and the absolute value of the voltage required in order for the multicolor particles to rotate.

14. A non-transitory computer readable storage medium storing an image display program causing a computer to execute a processing for display-driving an image display device,
the image display device having an image display medium including:
a pair of substrates at least one of that is light-transmissive;
a liquid enclosed between the substrates; and
three or more types of colored particles dispersed in the liquid that move in accordance with electric fields applied between the substrates and have different colors and polarities,
at least one type of the colored particles being charged to an opposite polarity from at least one other type of colored particles, and
the colored particles including:
first particles colored a predetermined first color, and being positively polarized,
second particles colored a second color that is different from the first color, and being negatively polarized, absolute values of voltages required in order for the second particles to move being smaller than absolute values of voltages required in order for the first particles to move, and
third particles colored a third color that is different from the first and the second colors, and being negatively polarized, absolute values of voltages required in order for the third particles to move being smaller than the absolute values of the voltages required in order for the first particles and the second particles to move, and
the program causing the computer to execute processing comprising:
a first step of applying, between the substrates, a negative voltage required in order for the first particles to move, and displaying the first color when the first particles are positively polarized, and displaying a seventh color that is a subtractive color mixture of the second color and the third color when the first particles are negatively polarized;
a second step of applying, between the substrates, a positive voltage required in order for the third particles to move in a state in which the first color or the seventh color is displayed, and displaying a fourth color that is a subtractive color mixture of the first color and the third color when the first particles are positively polarized, and displaying the second color when the first particles are negatively polarized;
a third step of applying, between the substrates, a positive voltage required in order for the second particles to move in a state in which the first color or the seventh color is displayed, and displaying a fifth color that is a subtractive color mixture of the first particles, the second particles and the third particles when the first particles are positively polarized, and displaying an eighth color when the first particles are negatively polarized;
a fourth step of applying, between the substrates, a negative voltage required in order for the third particles to move in a state in which the fifth color or the eighth color is displayed, and displaying a sixth color that is a subtractive color mixture of the first particles and second particles when the first particles are positively polarized, and displaying the third color when the first particles are negatively polarized;
a fifth step of applying, between the substrates, a positive voltage required in order for the first particles to move, and displaying the seventh color when the first particles are positively polarized, and displaying the first color when the first particles are negatively polarized;
a sixth step of applying, between the substrates, a negative voltage required in order for the third particles to move in a state in which the seventh color or the first color is displayed, and displaying the second color when the first particles are positively polarized, and displaying the fourth color when the first particles are negatively polarized;

a seventh step of applying, between the substrates, a negative voltage required in order for the second particles to move in a state in which the seventh color or the first color is displayed, and displaying the eighth color when the first particles are positively polarized, and displaying the fifth color when the first particles are negatively polarized; and an eighth step of applying, between the substrates, a positive voltage required in order for the third particles to move in a state in which the eighth color or the fifth color is displayed, and displaying the sixth color when the first particles are positively-polarized, and displaying the third color when the first particles are negatively-polarized.

15. An image display method for display-driving an image display device, the image display device having an image display medium including:

a pair of substrates at least one of which is light-transmissive;

a liquid enclosed between the substrates; and three or more types of colored particles dispersed in the liquid that move in accordance with electric fields applied between the substrates and have different colors and polarities, and at least one type of the colored particles having an opposite polarity from at least one other type of colored particles, and the colored particles including:

first particles colored a predetermined first color, and are positively polarized, second particles colored a second color that is different from the first color, and are negatively polarized, absolute values of voltages required in order for the second particles to move being smaller than absolute values of voltages required in order for the first particles to move, and third particles colored a third color that is different from the first color and the second color, and are negatively polarized, absolute values of voltages required in order for the third particles to move being smaller than the absolute values of the voltages required in order for the first particles and the second particles to move, the method comprising:

a first step of applying, between the substrates, a negative voltage required in order for the first particles to move, and displaying the first color when the first particles are positively polarized, and displaying a seventh color that is a subtractive color mixture of the second color and the third color when the first particles are negatively polarized;

a second step of applying, between the substrates, a positive voltage required in order for the third particles to move in a state in which the first color or the seventh color is displayed, and displaying a fourth color that is a subtractive color mixture of the first color and the third color when the first particles are positively-polarized, and displaying the second color when the first particles are negatively-polarized;

a third step of applying, between the substrates, a positive voltage required in order for the second particles to move in a state in which the first color or the seventh color is displayed, and displaying a fifth color that is a subtractive color mixture of the first particles, the second particles and the third particles when the first particles are positively-polarized, and displaying an eighth color when the first particles are negatively-polarized;

a fourth step of applying, between the substrates, a negative voltage required in order for the third particles to move in a state in which the fifth color or the eighth color is displayed, and displaying a sixth color that is a subtractive color mixture of the first particles and second particles when the first particles are positively-polarized, and displaying the third color when the first particles are negatively-polarized;

a fifth step of applying, between the substrates, a positive voltage required in order for the first particles to move, and displaying the seventh color when the first particles are positively-polarized, and displaying the first color when the first particles are negatively-polarized;

a sixth step of applying, between the substrates, a negative voltage required in order for the third particles to move in a state in which the seventh color or the first color is displayed, and displaying the second color when the first particles are positively-polarized, and displaying the fourth color when the first particles are negatively-polarized;

a seventh step of applying, between the substrates, a negative voltage required in order for the second particles to move in a state in which the seventh color or the first color is displayed, and displaying the eighth color when the first particles are positively-polarized, and displaying the fifth color when the first particles are negatively-polarized; and an eighth step of applying, between the substrates, a positive voltage required in order for the third particles to move in a state in which the eighth color or the fifth color is displayed, and displaying the sixth color when the first particles are positively-polarized, and displaying the third color when the first particles are negatively-polarized.

* * * * *